United States Patent Office 3,395,178
Patented July 30, 1968

3,395,178
PROCESS FOR PRODUCING UNSATURATED CARBOXYLIC ACIDS WITH PHOSPHOMOLYBDIC ACID ON SILICON CARBIDE AS CATALYST
James L. Callahan, Bedford Heights, Ohio, assignor to The Standard Oil Company, Cleveland, Ohio, a corporation of Ohio
No Drawing. Continuation-in-part of application Ser. No. 159,152, Dec. 31, 1961. This application Mar. 8, 1965, Ser. No. 438,037
3 Claims. (Cl. 260—530)

This is a continuation-in-part application of my co-pending patent application Ser. No. 159,152 now abandoned.

The present invention relates to improved oxidation catalysts, to a method of preparing such catalysts, and to a method of converting unsaturated aldehydes to unsaturated carboxylic acids employing such catalysts. The catalysts of this invention are characterized by the fact that they may be used for extended periods of time without appreciable diminution of their effectiveness. The catalysts are further characterized by the fact that their active catalytic ingredient is phosphomolybdic acid.

A number of processes are known by means of which unsaturated aldehydes may be converted to the corresponding unsaturated carboxylic acid. Such processes may be employed, for example, to convert acrolein to acrylic acid or methacrolein to methacrylic acid. One of the known processes involves the vapor phase catalytic oxidation of unsaturated aldehydes to the corresponding unsaturated acids and this process is described in U.S. Patent No. 2,881,212 to Idol et al. According to the latter patent, phosphomolybdic acid makes an excellent catalyst for such a process, particularly for the conversion of acrolein to acrylic acid. The patent suggests that phosphomolybdic acid might be employed in conjunction with catalyst support, but only silica, titania and zirconium oxide are expressly mentioned in the patent as being suitable for this purpose.

While it has been established that unsupported phosphomolybdic acid is an excellent catalyst for the conversion of unsaturated aldehydes to the corresponding unsaturated carboxylic acids, it has been observed that the physical form of this catalyst changes upon use so as to eventually render it ineffective. The available evidence seems to indicate that the physical deterioration of the unsupported phosphomolybdic acid is caused by a change in its crystal structure. In the presence of steam at elevated temperatures, discrete particles of phosphomolybdic acid recrystallize and tend to agglomerate into a solid mass.

It is therefore one object of this invention to provide improved catalysts comprising phosphomolybdic acid which will maintain both their physical stability and chemical activity even after periods of extended use. Another object of this invention is to provide a method of making such catalysts. Still another object of this invention is to provide a catalytic process for the conversion of unsaturated aldehydes to unsaturated acids which may be operated for extended periods of time without physical deterioration of the catalyst.

In brief, the catalysts of this invention comprise phosphomolybdic acid and silicon carbide. In accordance with the invention the catalysts are prepared by impregnating discrete pellets of silicon carbide with phosphomolybdic acid followed by a carefully controlled sequence of heat treating steps.

As pointed out above, one of the essential ingredients of the catalysts of this invention is phosphomolybdic acid. Two distinct chemical forms of phosphomolybdic are known to exist at room temperature. The most common form is known as phosphoduodecimolybdic acid and it has a chemical formula corresponding to $$P_2O_5 \cdot 24MoO_3 \cdot xH_2O$$

The other form is known as phospholuteomolybdic acid and it has a chemical formula corresponding to $$P_2O_5 \cdot 18MoO_3 \cdot xH_2O$$

The phosphomolybdic acid which is sold in commerce is usually a mixture of the two forms and it has been discovered that the optimum ratio of the two forms from the standpoint of conversion and yield for the production of acrylic acid from acrolein is one which will provide a molybdenum to phosphorus ratio of about 10 to 1 in the mixture. Since other forms of phosphomolybdic acid may exist under elevated temperature conditions, ratios of molybdenum to phosphorus in the range of about 6 to 1 to about 15 to 1 are contemplated within the scope of this invention.

Commercial phosphomolybdic acid is relatively expensive and accordingly in some instances it may be desirable to prepare phosphomolybdic acid as needed from less expensive raw materials, i.e., molybdenum oxide and phosphoric acid. One method of preparing the phosphomolybdic acid is to prepart an aqueous phosphoric acid dispersion of molybdenum oxide. The resulting dispersion is then heated at a temperature of about 100° C. until the dispersion changes from a cloudy milky appearing dispersion to a yellow appearing solution. This color change is indicative of the formation of phosphomolybdic acid and when it appears the solution is dried. One convenient way of drying the solution is by conventional spray drying techniques resulting in the formation of phosphomolybdic acid in solid particle form. The dry phosphomolybdic acid is dissolved in water as needed. Alternatively, the solution of phosphomolybdic acid may be concentrated by removing a part of the water so as to provide a solution containing about 66% by weight of phosphomolybdic acid and this solution may be used to impregnate the silicon carbide pellets.

The other essential ingredient of the catalysts of this invention is silicon carbide. The silicon carbide need not be pure, but it should contain at least 50% by weight of pure silicon carbide. Minor amounts of impurities such as aluminum oxide, silica, iron oxide, and calcium oxide may be present along with the silicon carbide. Since the silicon carbide is impregnated with phosphomolybdic acid in accordance with the present invention, it is important that the silicon carbide be rather porous and, in general, it should be macro-porous, i.e., have a surface area of less than about one square meter per gram. For the purposes of this invention, the silicon carbide should be in small discrete particulate form, as for example, in the form of small rod-like pellets. Any convenient size may be employed, but a pellet size in the range of ¹⁄₁₆" x ¹⁄₁₆" to ¼" x ¼" has been found to be particularly convenient.

In an effort to overcome the problem of the physical instability of the unsupported phosphomolybdic acid catalyst, a number of catalysts were prepared in which the acid was impregnated on a variety of supports. Only one of these supports gave the desired result and that material was silicon carbide. The silica support suggested by the prior art proved unsuitable since the catalyst utilizing the silica support had poor physical stability. In the presence of silica, molybdenum will eventually crystallize in the form of long whisker-like projections which are abraded from the catalyst surface with a resulting loss of molybdenum from the silica-supported catalyst. A catalyst of improved physical stability was an urgent commercial need. Other supports which were tried such as alumina, magnesia, titania and zirconia resulted in catalyst compositions which were not satisfactory either because of poor physical stability or because they did not possess the same high level of catalytic activity as the unsupported phosphomolybdic acid when used for prolonged periods under the usual operating conditions. Of the various support materials tried, it was quite surprising and unexpected to discover that silicon carbide could be combined with phosphomolybdic acid to produce a catalyst with the requisite chemical and physical properties, and, hence, silicon carbide appears to be unique in this respect.

One of the important advantages results from the use of silicon carbide in the catalysts of this invention resides in the excellent thermal conductivity of the catalysts. This is an important consideration in the design of reactors for carrying out catalytic reactions and particularly those reactors which employ a so-called fixed bed of catalyst. The latter type of bed is usually made up of a plurality of discrete catalyst particles, usually in the form of pellets, so as to permit the flow of fluid therethrough. If a catalyst having poor thermal conductivity is employed in a fixed bed reactor, the bed may develop localized hot spots, especially when an exothermic reaction is conducted therein. Such hot spots will cause the catalyst particles to agglomerate which eventually will prevent the passage of fluid therethrough. When this occurs the catalyst in the bed must be replaced. However, when a catalyst possessing good thermal conductivity is employed in a fixed bed reactor, the problems associated with localized hot spots which have been described above are substantially precluded.

The relative proportions of the phosphomolybdic acid and silicon carbide are important and it has been found that the optimum composition from the standpoint of catalytic activity should comprise about 35% by weight of phosphomolybdic acid. When the amount of phosphomolybdic acid exceeds about 35% by weight the resulting catalyst does not have the requisite physical stability, and consequently catalysts containing more than about 35% phosphomolybdic acid are outside the scope of this invention. While a catalyst containing as little as 1% by weight of phosphomolybdic acid will exhibit some activity, compoistions containing less than about 10% of phosphomolybdic acid are usually uneconomic.

The catalyst is prepared by impregnating pellets of the silicon carbide with an aqueous solution of phosphomolybdic acid. The impregnation step may be conveniently carried out by immersing the silicon carbide pellets into an aqueous solution of phosphomolybdic acid. After immersion the wet pellets are dried and a temperature in the range of about 212° F. to about 350° F. is adequate for this purpose. In order to prevent the agglomeration of the impregnated pellets during the drying step, it may be desirable to employ a rotary drier which will continuously tumble the pellets as they are dried and prevent them from sticking together.

When the impregnated pellets are substantially dry, the pellets are then calcined for a period of time at a temperature in the range of 700° F. to 1000° F. It has been found that in order to achieve the maximum activity in the final catalyst composition, the catalyst should be calcined for a period of time not less than two hours. Calcination for periods longer than thirty hours is usually unnecessary.

The catalysts of this invention are particularly useful in processes of the type described in U.S. Patent 2,881,212 referred to above, and the same operating conditions outlined in that patent may be employed. Such processes are preferably conducted in a "fixed bed" reactor wherein the catalyst pellets are disposed within a plurality of tubes surrounded by an appropriate heat transfer medium.

In order to illustrate a preferred embodiment of this invention, a catalyst was prepared in accordance with the method described below:

Thirty-eight pounds of $MoO_3$ were dissolved in 45 gallons of water. 1530 g. of $H_3PO_4$ (85%) were next added to the solution and the mixture was heated to 212° F. After eight hours, the color of the solution changed to yellow whereupon the heating was discontinued and the solution was spray dried. The spray drier was operated with an inlet air temperature of 700° F. and an outlet air temperature of 350° F.

One thousand seven hundred and fifty grams of phosphomolybdic acid prepared in accordance with the foregoing procedure were dissolved in 900 ml. of distilled water. Next 1750 g. of ⅛" x ⅛" pellets of silicon carbide were immersed in the solution of phosphomolybdic acid. Analysis of the silicon carbide pellets prior to immersion showed that they contained 62% of silicon carbide, 29% of silica, 6% of alumina and minor amounts of ferric oxide, titanium dioxide, sodium oxide, potassium oxide, magnesium oxide, and calcium oxide. The silicon carbide pellets had the following physical properties:

| | | |
|---|---|---:|
| Porosity | percent | 36 |
| Water adsorption | do | 19–20 |
| Bulk density | g./cc | 1.89 |
| App. Sp. gravity | g./cc | 2.99 |
| Packing density | lb./cu. ft | 63 |
| Surface area | sq.m./g | <1 |

The wet pellets were dried in an oven at 302° F. for 12 hours, and then calcined at 800° F. for seven hours. Analysis of the dried and calcined pellets showed that they contained 35% by weight of phosphomolybdic acid.

In order to demonstrate the effect of water at elevated temperature on phosphomolybdic acid per se and combined with silicon carbide, two samples of catalyst pellets were prepared. One of the samples consisted of phosphomolybdic acid per se and the other consisted of silicon carbide pellets impregnated with 22.5% by weight of phosphomolybdic acid. Equal amounts of each catalyst were placed in separate Pyrex tubes together with sufficient water to provide a partial pressure of water within the tube of 25 p.s.i. at 800° F. The tubes were sealed and placed in an oven where the temperature was maintained at 800° F. for about 315 hours. At the end of this period, the catalyst samples were removed from the Pyrex tubes and examined under a microscope. This examination revealed that the pure phosphomolybdic acid catalyst had crystallized into a fluffy ball of whisker-like crystals whereas the silicon carbide supported catalyst evidenced no sign of any physical deterioration.

In order to compare the silicon carbide supported catalyst with the unsupported phosphomolybdic acid catalyst, both catalysts were tested for their effectiveness in converting acrolein to acrylic acid. In both of these tests, the same reactor was employed and in each instance the reactor contained a fixed bed of catalyst in pellet form. The feed to the reactor in both tests had the following composition:

| Ingredient: | Mol, percent |
|---|---:|
| Acrolein | 10.5 |
| Air | 26.3 |
| Water | 63.2 |

The operating conditions in both tests were substantially similar, i.e., a temperature of 875° F., a pressure near atmospheric, and a contact time of about ten seconds. In one test, unsupported phosphomolybdic acid was employed as the catalyst (Catalyst A), while in the other the catalyst (Catalyst B) was silicon carbide impregnated with 35% by weight of phosphomolybdic acid. The results were as follows:

| Catalyst | Percent Acrolein Converted to Acrylic Acid | Percent Yield of Acrylic Acid Based on Acrolein |
|---|---|---|
| A | 40.7 | 84.4 |
| B | 40.2 | 85.3 |

From the above data, it will be seen that the supported catalyst gives a slightly lower conversion of acrolein to acrylic acid, but the yield is slightly higher so that the two are about equal for practical purposes insofar as their catalytic activity is concerned. Furthermore, life studies of the two catalysts in the same process have clearly shown that the impregnated silicon carbide catalyst may be used for indefinite periods of time without sign of physical deterioration. On the other hand, the unsupported phosphomolybdic acid catalyst deteriorates rapidly and in one series of tests it was necessary to replace this catalyst after only 64 hours of operation because its physical deterioration caused plugging of the reactor.

It will be obvious from the foregoing description that many modifications of the catalysts, method of making the catalysts, and methods of employing the catalysts for the conversion of unsaturated aldehydes to unsaturated acids may be made without departing from the spirit or scope of this invention and this application for Letters Patent is intended to cover all such modifications as would reasonably fall within the scope of the appended claims.

I claim:

1. In a method of manufacturing unsaturated carboxylic acids by reacting a corresponding unsaturated aldehyde with oxygen at about 875° F. with a contact time of about 10 seconds, in the presence of a catalyst composition consisting of phosphomolybdic acid on a support or carrier, the improvement consisting of using as the catalyst composition silicon carbide which has been impregnated with said phosphomolybdic acid in the range of about 1 to 35 percent by weight of said catalyst composition.

2. The process of claim 1 wherein said unsaturated aldehyde is acrolein and said unsaturated carboxylic acid is acrylic acid.

3. The process of claim 1 wherein said unsaturated aldehyde is methacrolein and said unsaturated carboxylic acid is methacrylic acid.

References Cited
UNITED STATES PATENTS

| | | | |
|---|---|---|---|
| 2,881,212 | 4/1959 | Idol et al. | 252—437 X |
| 3,087,964 | 4/1963 | Koch et al. | 252—435 X |
| 3,057,923 | 10/1962 | Hellin et al. | 252—435 X |

LORRAINE A. WEINBERGER, *Primary Examiner.*

V. GARNER, *Assistant Examiner.*